US010310991B2

United States Patent
Okhravi et al.

(10) Patent No.: US 10,310,991 B2
(45) Date of Patent: Jun. 4, 2019

(54) TIMELY ADDRESS SPACE RANDOMIZATION

(71) Applicant: Massachusetts Institute of Technology, Cambridge, MA (US)

(72) Inventors: Hamed Okhravi, Billerica, MA (US); Thomas R. Hobson, Belmont, MA (US); David O. Bigelow, Maynard, MA (US); Robert Rudd, Cambridge, MA (US); William W. Streilein, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 58 days.

(21) Appl. No.: 15/234,028

(22) Filed: Aug. 11, 2016

(65) Prior Publication Data
US 2018/0046585 A1  Feb. 15, 2018

(51) Int. Cl.
*G06F 11/00* (2006.01)
*G06F 21/78* (2013.01)
(Continued)

(52) U.S. Cl.
CPC ........ *G06F 12/1408* (2013.01); *G06F 12/023* (2013.01); *G06F 16/245* (2019.01);
(Continued)

(58) Field of Classification Search
CPC ........ G06F 21/54; G06F 21/52; G06F 21/577; G06F 21/575; G06F 21/565;
(Continued)

(56) References Cited

U.S. PATENT DOCUMENTS 5,850,525 A * 12/1998 Kalkunte .......... H04L 12/40143
709/235
6,381,669 B1 * 4/2002 Chudnovsky ....... G06F 12/0292
711/202
(Continued)

OTHER PUBLICATIONS

Andrei Homescu et al., Librando: transparent code randomization for just-in-time compilers, Nov. 4-8, 2013, [Retrieved on Jan. 28, 2019]. Retrieved from the internet: <URL: https://dl.acm.org/citation.cfm?id=2516675> 11 Pages (993-1004) (Year: 2013).*
(Continued)

*Primary Examiner* — Anibal Rivera
(74) *Attorney, Agent, or Firm* — Daly, Crowley, Mofford & Durkee LLP

(57) ABSTRACT

A method for timely address space randomize includes loading a code region from a program binary to a first location within the address space, detecting, during execution of the program, an output-input call pair from the program and, in response to detecting the output-input call pair from the program: selecting a second location within the address space to move the code region to, determining memory locations of one or more references to the code region, updating the values of the references in memory based on the second location and using annotation information within the program binary, and moving the code region to the second location within the address space.

20 Claims, 6 Drawing Sheets

(51) Int. Cl.
| | |
|---|---|
| *G06F 9/44* | (2018.01) |
| *G06F 21/60* | (2013.01) |
| *G06F 21/52* | (2013.01) |
| *G06F 12/14* | (2006.01) |
| *G06F 21/12* | (2013.01) |
| *G06F 21/54* | (2013.01) |
| *G06F 21/57* | (2013.01) |
| *G06F 16/245* | (2019.01) |
| *G06F 12/02* | (2006.01) |

(52) U.S. Cl.
CPC ............ *G06F 21/125* (2013.01); *G06F 21/52* (2013.01); *G06F 21/54* (2013.01); *G06F 21/577* (2013.01); *G06F 2212/1052* (2013.01)

(58) Field of Classification Search
CPC .... G06F 21/604; G06F 21/566; G06F 9/5016; G06F 8/4434; G06F 12/1416; G06F 12/1475; G06F 9/4881; G06F 21/56; G06F 21/57; G06F 21/554; G06F 8/41; G06F 8/65; G06F 11/3466; H04L 1/005
See application file for complete search history.

(56) References Cited

U.S. PATENT DOCUMENTS

| | | | | |
|---|---|---|---|---|
| 7,546,430 | B1* | 6/2009 | Miller | G06F 12/1408 711/163 |
| 7,971,255 | B1* | 6/2011 | Kc | G06F 21/566 713/164 |
| 8,646,050 | B2* | 2/2014 | Vidrine | G06F 21/57 717/146 |
| 9,104,869 | B2* | 8/2015 | Tobin | G06F 21/56 |
| 9,213,531 | B2* | 12/2015 | Tallam | G06F 8/4434 |
| 9,256,552 | B2* | 2/2016 | Epstein | G06F 12/1416 |
| 9,754,112 | B1* | 9/2017 | Moritz | G06F 21/577 |
| 2002/0152061 | A1 | 10/2002 | Shimogori et al. | |
| 2003/0182491 | A1* | 9/2003 | Chudnovsky | G06F 12/0292 711/5 |
| 2003/0231630 | A1* | 12/2003 | Messenger | H04L 45/00 370/392 |
| 2006/0052962 | A1* | 3/2006 | Shipton | B41J 2/04505 702/106 |
| 2007/0234296 | A1* | 10/2007 | Zorn | G06F 11/008 717/124 |
| 2008/0016314 | A1* | 1/2008 | Li | G06F 21/554 711/200 |
| 2008/0060077 | A1 | 3/2008 | Cowan et al. | |
| 2009/0060176 | A1* | 3/2009 | Yokota | H04L 9/0662 380/28 |
| 2009/0183261 | A1* | 7/2009 | Peinado | G06F 21/565 726/24 |
| 2011/0145472 | A1* | 6/2011 | Whitehouse | G06F 8/65 711/103 |
| 2011/0191848 | A1* | 8/2011 | Zorn | G06F 11/00 726/22 |
| 2011/0293045 | A1* | 12/2011 | Gross | H04L 1/005 375/340 |
| 2012/0047259 | A1 | 2/2012 | Krasser et al. | |
| 2013/0024930 | A1* | 1/2013 | Steil | G06F 21/575 726/16 |
| 2013/0086299 | A1* | 4/2013 | Epstein | G06F 12/1475 711/6 |
| 2013/0111587 | A1* | 5/2013 | Goel | G06F 21/577 726/23 |
| 2013/0132690 | A1* | 5/2013 | Epstein | G06F 12/1416 711/159 |
| 2013/0276056 | A1* | 10/2013 | Epstein | G06F 21/604 726/1 |
| 2014/0020112 | A1* | 1/2014 | Goodes | G06F 9/5016 726/26 |
| 2014/0282431 | A1* | 9/2014 | Delio, Jr. | G06F 11/3466 717/130 |
| 2014/0359773 | A1* | 12/2014 | Matthews | G06F 21/52 726/24 |
| 2015/0047049 | A1* | 2/2015 | Panchenko | G06F 21/54 726/26 |
| 2015/0106872 | A1* | 4/2015 | Hiser | G06F 21/56 726/1 |
| 2015/0294114 | A1* | 10/2015 | Monahan | G06F 8/41 726/26 |
| 2015/0317139 | A1* | 11/2015 | Tallam | G06F 8/4434 717/151 |
| 2016/0034687 | A1* | 2/2016 | Rhee | G06F 21/52 726/23 |
| 2016/0092674 | A1* | 3/2016 | Hughes | G06F 21/52 726/22 |
| 2016/0092675 | A1* | 3/2016 | Vidrine | G06F 21/52 726/22 |
| 2016/0140031 | A1 | 5/2016 | Sun et al. | |
| 2017/0123859 | A1* | 5/2017 | Khojastepour | G06F 9/4881 |
| 2017/0124322 | A1* | 5/2017 | Guilley | G06F 21/54 |
| 2017/0286674 | A1* | 10/2017 | Gathala | G06F 3/0623 |
| 2018/0173433 | A1* | 6/2018 | Miller | H04L 67/2842 |

OTHER PUBLICATIONS

Stephen Crane et al., Readactor: Practical Code Randomization Resilient to Memory Disclosure, 2015 IEEE, [Retrieved on Jan. 28, 2019]. Retrieved from the internet: <URL: https://ieeexplore.ieee.org/stamp/stamp.jsp?tp=&arnumber=7163059> 18 Pages (763-780) (Year: 2015).*

PCT International Search Report and Written Opinion dated Oct. 16, 2017 for International Application No. PCT/US17/34970; 12 pages.

Lu et al., "How to Make ASLR Win the Clone Wars: Runtime Re-Randomization;" Georgia Institute of Technology; Feb. 21-24, 2016; 15 pages.

North, "Identifying Memory Address Disclosures;" De Montfort University; Jan. 2015; 150 pages.

U.S. Appl. No. 15/185,370, filed Jun. 17, 2016, Okhravi et al.

Abadi et al., "Control-Flow Integrity;" Proceedings of the 12th ACM Conference on Computer and Communications Security; Nov. 2005; 14 Pages.

Akritidis, "Cling: A Memory Allocator to Mitigate Dangling Pointers;" Proceedings of the USENIX Security Symposium; Aug. 2010; 16 Pages.

Anderson, "Computer Security Technology Planning Study;" ESD-TR-73-51, vol. II; Technical Report, DTIC Document; Oct. 1972; 142 Pages.

Backes et al., "Oxymoron: Making Fine-Grained Memory Randomization Practical by Allowing Code Sharing;" Proceedings of the 23rd USENIX Security Symposium; Aug. 20-22, 2014; 16 Pages.

Backes et al., "You Can Run but You Can't Read: Preventing Disclosure Exploits in Executable Code;" Proceedings of the 21st ACM Conference on Computer and Communications Security (CCS '14); Nov. 3-7, 2014; 12 Pages.

Barrantes et al., "Randomized Instruction Set Emulation to Disrupt Binary Code Inject Attacks;" Proceedings of the 10th ACM Conference on Computer and Communications Security (CCS '03); Oct. 27-30, 2003; 10 Pages.

Bigelow et al., "Timely Rerandomization for Mitigating Memory Disclosure;" Published/Presented Oct. 13, 2015; Proceedings of the 22nd ACM Conference on Computer and Communications Security; Oct. 12-16, 2015; 12 Pages.

Bittau et al., "Hacking Blind;" Proceedings of the 35th IEEE Symposium on Security and Privacy; May 2014; 16 Pages.

Caselden et al., "Operation Greedywonk: Multiple Economic and Foreign Policy Sites Compromised, Serving Up Flash Zero-Day Exploit;" FireEye Threat Research Blog posted on Feb. 20, 2014; 8 Pages.

Chen et al., "MemBrush: A Practical Tool to Detect Custom Memory Allocators in C Binaries;" Proceedings of the 20th Working Conference on Reverse Engineering (WCRE '13); Oct. 14-17, 2013; 2 Pages.

Chen, "ASLR Bypass Apocalypse in Recent Zero-Day Exploits;" FireEye Threat Research Bog posted on Oct. 15, 2013; 8 Pages.

(56) References Cited

OTHER PUBLICATIONS

Chen et al., "New Zero-Day Exploit Targeting Internet Explorer Versions 9 Through 11 Identified in Targeted Attacks;" FireEye Threat Research Blog posted on Apr. 26, 2014; 4 Pages.

Common Vulnerabilities and Exposures (CVE), "CVE-2013-2028;" Webpage Retrieved from <https://cve.mitre.org/cgi-bin/cvename.cgi?name=CVE-2013-2028>; Jan. 2013; 2 Pages.

Corelan Team, "Exploit Writing Tutorial Part 6: Bypassing Stack Cookies, SafeSeh, SEHOP, HW DEP and ASLR;" Published on Sep. 21, 2009; Retrieved from <https://www.corelan.be>; 69 Pages.

Cowan et al., "Protecting Systems from Stack Smashing Attacks with StackGuard;" Linux Expo, Citeseer; Jan. 1999; 11 Pages.

Crane et al., "Readactor: Practical Code Randomization Resilient to Memory Disclosure;" Proceedings of the 36th IEEE Symposium on Security and Privacy; May 18-20, 2015; 18 Pages.

Curtsinger et al., "Stabilizer: Statistically Sound Performance Evaluation;" Proceedings of the 18th International Conference on Architectural Support for Programming Languages and Operating Systems (ASPLOS '13); Mar. 16-20, 2013; 10 Pages.

Davi et al., "Isomeron: Code Randomization Resilient to (Just-In-Time) Return-Oriented Programming;" Proceedings of the Network and Distributed System Security Symposium (NDSS '15); Feb. 8-11, 2015; 15 Pages.

Durden, "Bypassing PaX ASLR Protection;" Phrack Magazine, vol. 59; Released Jul. 28, 2002; 18 Pages.

Eager, "Introduction to the DWARF Debugging Format;" Retrieved from <http://www.dwarfstd.org>; Feb. 2007; 10 Pages.

Evans et al., "Missing the Point(er): On the Effectiveness of Code Pointer Integrity;" Proceedings of the IEEE Symposium on Security and Privacy; May 17-21, 2015; 16 Pages.

FireEye, "Zero-Day Danger: A Survey of Zero-Day Attacks and What They Say About the Traditional Security Model;" White Paper; Jan. 2014; 16 Pages.

Giuffrida et al., "Enhanced Operating System Security Through Efficient and Fine-Grained Address Space Randomization;" Proceedings of the 21st USENIX Security Symposium; Aug. 8-10, 2012; 16 Pages.

Göktas et al., "Out of Control: Overcoming Control-Flow Integrity;" Proceedings of the IEEE Symposium on Security and Privacy; May 18-21, 2014; 15 Pages.

Heartbleed.com, "The Heartbleed Bug;" Retrieved from <http://www.heartbleed.com/>; Webpage Updated Apr. 29, 2014; 7 Pages.

Hiser et al., "ILR: Where'd My Gadgets Go?;" Proceedings of the IEEE Symposium on Security and Privacy; May 20-23, 2012; 15 Pages.

Hobson et al., "On the Challenges of Effective Movement;" Proceedings of the 1st ACM Workshop on Moving Target Defense (MTD '14); Nov. 3, 2014; 10 Pages.

ISO, *ISO/IEC 9899:2011*, "Information Technology—Programming Languages—C;" American National Standard; Date of Approval: May 23, 2012; 702 Pages.

Jackson et al., "Compiler-Generated Software Diversity;" Chapter 4 from the book *Moving Target Defense: Creating Asymmetric Uncertainty for Cyber Threats*; Published in 2011; pp. 77-98; 22 Pages.

Jim et al., "Cyclone: A Safe Dialect of C;" Proceedings of the USENIX Annual Technical Conference, General Track; Dec. 2001; pp. 275-288; 14 Pages.

Kc et al., "Countering Code-Injection Attacks with Instruction-Set Randomization;" Proceedings of the 10th ACM Conference on Computer and Communications Security (CCS '03); Oct. 27-30, 2003; 10 Pages.

Keromytis et al., "The MINESTRONE Architecture Combining Static and Dynamic Analysis Techniques for Software Security;" Proceedings of the IEEE First SysSec Workshop; Jul. 6, 2011; pp. 53-56; 4 Pages.

Kil et al., "Address Space Layout Permutation (ASLP): Towards Fine-Grained Randomization of Commodity Software;" Proceedings of the IEEE 22nd Annual Computer Security Applications Conference (ACSAC '06); Dec. 2006; 10 Pages.

Kuznetsov et al., "Code-Pointer Integrity;" Proceedings of the 11th USENIX Symposium on Operating Systems Design and Implementation; Oct. 6-8, 2014; 18 Pages.

Kwiatkowska et al., "PRISM 4.0: Verification of Probabilistic Real-time Systems;" Proceedings of the 23rd International Conference on Computer Aided Verification (CAV '11), vol. 6806 of LNCS; Dec. 4, 2011; pp. 585-591; 7 Pages.

Luk et al., "Pin: Building Customized Program Analysis Tools with Dynamic Instrumentation;" Proceedings of the ACM SIGPLAN 2005 Conference on Programming Language Design and Implementation (PLDI '05); Jan. 2005; 11 Pages.

Mashtizadeh et al., "CCFI: Cryptographically Enforced Control Flow Integrity;" Proceedings of the 22nd ACM SIGSAC Conference on Computer and Communications Security (CCS '15); Oct. 12-16, 2015; pp. 941-951; 11 Pages.

Mohan et al., "Opaque Control-Flow Integrity;" Proceedings of the Network and Distributed System Security Symposium (NDSS '15); Feb. 8-11, 2015; 15 Pages.

Mosberger-Tang, "Libunwind(3): lubunwind—a (mostly) platform-independent unwind API;" *The Libunwind Project*; Retrieved from <http://www.nongnu.org/libunwind/man/libunwind(3).html>; Jan. 2014; 4 Pages.

MSDN: ReBaseImage Function; Retrieved from < https://msdn.microsoft.com/en-us/library/windows/desktop/aa363364%28v=vs.85%29.aspx>; 2015; 3 Pages.

Nagarakatte et al., "CETS: Compiler-Enforced Temporal Safety for C;" Proceedings of the ACM SIGPLAN Conference on International Symposium on Memory Management; (ISMM '10), vol. 45; Jun. 5-6, 2010; 10 Pages.

Nagarakatte et al., "SoftBound: Highly Compatible and Complete Spatial Memory Safety for C;" Proceedings of the ACM SIGPLAN Conference on Programming Language Design and Implementation (PLDI '09); Jun. 15-20, 2009; 14 Pages.

Necula et al., "CCured: Type-Safe Retrofitting of Legacy Code;" Proceedings of the ACM SIGPLAN Conference on Principles of Programming Languages (POPL '02), vol. 37; Jan. 16-18, 2002; pp. 128-139; 12 Pages.

Nergal, "The Advanced Return-into-lib(c) exploits: PaX Case Study;" Phrack Magazine, vol. 58, No. 4; Dec. 2001; 34 Pages.

Nethercote et al., "Valgrind: A Framework for Heavyweight Dynamic Binary Instrumentation;" Proceedings of the ACM SIGPLAN 2007 Conference on Programming Language Design and Implementation (PLDI '07); Jun. 11-13, 2007; 12 Pages.

Netmarketshare: Desktop Top Operating System Share Trend; Retrieved from <http://www.netmarketshare.com/operating-system-market-share.aspx?qpcustomb=0&qprid=11>; 2 Pages.

Okhravi et al., "Finding Focus in the Blur of Moving-Target Techniques;" Proceedings of the IEEE Security and Privacy, vol. 12, No. 2; Mar./Apr. 2014; 11 Pages.

One, "Smashing the Stack for Fun and Profit;" Phrack Magazine, vol. 7, Issue 49, File 14 of 16; Jan. 1999; 26 Pages.

Papadogiannakis et al., "ASIST: Architectural Support for Instruction Set Randomization;" Proceedings of the 2013 ACM SIGSAC Conference on Computer and Communications Security (CCS '13); Nov. 4-8, 2013; 12 Pages.

Pappas et al., "Smashing the Gadgets: Hindering Return-Oriented Programming Using In-Place Code Randomization;" Proceedings of the IEEE Symposium on Security and Privacy; May 20-23, 2012; pp. 601-615; 15 Pages.

Parno et al., "Bootstrapping Trust in Commodity Computers;" Proceedings of the 31st IEEE Symposium on Security and Privacy; May 16-19, 2010; pp. 414-429; 16 Pages.

PaX: PaX Address Space Layout Randomization; Retrieved from <https://pax.grsecurity.net/docs/aslr.txt>; 2003; 4 Pages.

Rafkind et al., "Precise Garbage Collection for C;" Proceedings of the ACM SIGPLAN International Symposium on Memory Management (ISMM '09); Jun. 19-20, 2009; 10 Pages.

Robertston et al., "Run-Time Detection of Heap-Based Overflows;" Proceedings of the 17th Large Installation Systems Administration Conference (LISA '03); Oct. 26-31, 2003; pp. 51-60; 11 Pages.

(56) References Cited

OTHER PUBLICATIONS

Schuster et al., "Counterfeit Object-oriented Programming: On the Difficulty of Preventing Code Reuse Attacks in C++ Applications;" Proceedings of the $36^{th}$ IEEE Symposium on Security and Privacy; May 18-20, 2015; 18 Pages.
Scott et al., "Retargetable and Reconfigurable Software Dynamic Translation;" Proceedings of the International Symposium on Code Generation and Optimization: Feedback-Directed and Runtime Optimization (CGO '03); Mar. 23-26, 2003; pp. 36-47; 12 Pages.
Seibert et al., "Information Leaks Without Memory Disclosures: Remote Side Channel Attacks on Diversified Code;" Proceedings of the $21^{st}$ ACM Conference on Computer and Communications Security (CCS '14); Nov. 3-7, 2014; 12 Pages.
Serebryany et al., "AddressSanitizer: A Fast Address Sanity Checker;" Proceedings of the USENIX Annual Technical Conference (ATC '12); Jun. 13-15, 2012; pp. 309-318; 10 Pages.
Shacham, "The Geometry of Innocent Flesh on the Bone: Return-into-libc Without Function Calls (on the x86);" Proceedings of the $14^{th}$ ACM Conference on Computer and Communications Security (CCS '07); Oct. 29, 2007; 30 Pages.
Shacham et al., "On the Effectiveness of Address-Space Randomization;" Proceedings of the ACM Conference on Computer and Communications Security (CCS '04); Oct. 25-29, 2004; 10 Pages.
Snow et al., "Just-In-Time Code Reuse: On the Effectiveness of Fine-Grained Address Space Layout Randomization;" Proceedings of the 2013 IEEE Symposium on Security and Privacy; May 19-22, 2013; pp. 574-588; 15 Pages.
Sovarel et al., "Where's the FEEB? The Effectiveness of Instruction Set Randomization;" Proceedings of the $14^{th}$ USENIX Security Symposium; Aug. 1-5, 2005; 16 Pages.
Stanford Secure Computer Systems Group, "Blind Return Oriented Programming (BROP);" Research Paper Retrieved from <http://www.scs.stanford.edu/brop/>; Jan. 2014; 2 Pages.
Strackx et al., "Breaking the Memory Secrecy Assumption;" Proceedings of the $2^{nd}$ European Workshop on System Security (EUROSEC '09); Mar. 31, 2009; 8 Pages.
Szekeres et al., "SoK: Eternal War in Memory;" Proceedings of the IEEE Symposium on Security and Privacy; May 19-22, 2013; 15 Pages.
Tice et al., "Enforcing Forward-Edge Control-Flow Integrity in GCC & LLVM;" Proceedings of the $23^{rd}$ USENIX Security Symposium; Aug. 20-22, 2014; 16 Pages.
Wartell et al., "Binary Stirring: Self-randomizing Instruction Addresses of Legacy x86 Binary Code;" Proceedings of the 19th ACM Conference on Computer and Communications Security (CCS '12); Oct. 16-18, 2012; pp. 157-168; 12 Pages.
Williams et al., "Security through Diversity: Leveraging Virtual Machine Technology;" Proceedings of the $30^{th}$ IEEE Symposium on Security and Privacy; May 17-20, 2009; pp. 26-33; 8 Pages.
Zhang et al., "Control Flow Integrity for COTS Binaries;" Proceedings of the $22^{nd}$ USENIX Security Symposium; Aug. 14-16, 2013; pp. 337-362; 17 Pages.
Zhang et al., "Practical Control Flow Integrity & Randomization for Binary Executables;" Proceedings of the IEEE Symposium on Security and Privacy; May 19-22, 2013; pp. 559-573; 15 Pages.
Office Action dated Dec. 15, 2017 for U.S. Appl. No. 15/185,370; 14 pages.
Response to U.S. Non-Final Office Action dated Dec. 15, 2017 for U.S. Appl. No. 15/185,370; Response filed on Mar. 15, 2018; 9 pages.
Final Office Action dated Jul. 13, 2018 for U.S. Appl. No. 15/185,370, 11 pages.
Wikipedia Definitions for Hooking, retrieved from https://en.wikipedia.org/wiki/Hooking#API/Function_Hooking/Interception_Using_JMP_Instruction_aka_splicing (Year: 2018); 1 page.
Wikipedia Definitions for DLL injection, retrieved from https://en.wikipedia.org/wiki/DLL_injection (Year: 2018); 5 pages.
Response to U.S. Final Office Action dated Jul. 13, 2018 for U.S. Appl. No. 15/185,370; Response filed on Oct. 11, 2018; 6 Pages.
Notice of Allowance dated Nov. 21, 2018 for U.S. Appl. No. 15/185,370; 12 Pages.

* cited by examiner

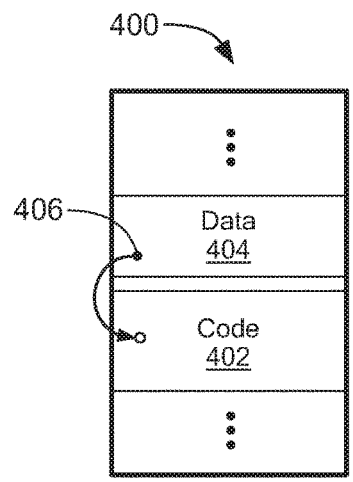
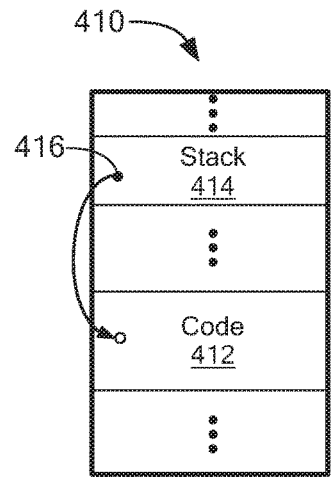
*FIG. 4A*  *FIG. 4B*
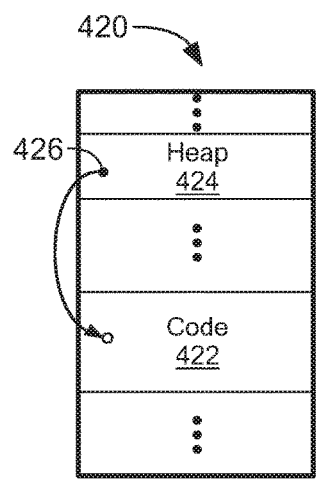
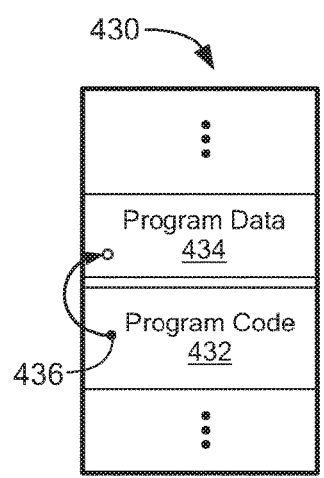
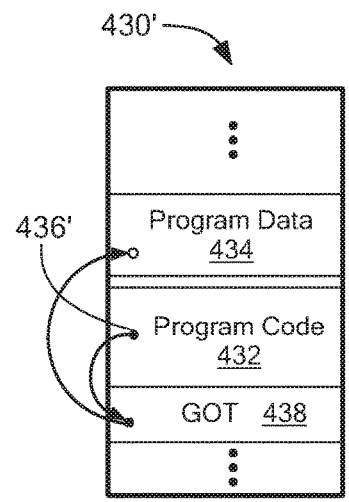
*FIG. 4C*  *FIG. 4D*  *FIG. 4E*

TIMELY ADDRESS SPACE RANDOMIZATION

STATEMENT REGARDING FEDERALLY SPONSORED RESEARCH

This invention was made with Government support under Contract No. FA8721-05-C-0002 awarded by the U.S. Air Force. The Government has certain rights in the invention.

BACKGROUND

Cyber attacks may rely upon techniques that can repurpose existing code in a software program (or "application") and cause that code to carry out malicious tasks. In order to accomplish this goal, an attacker may determine the location in memory of existing code that they wish to exploit, and then corrupt the program state in a way such that their desired actions are carried out instead of the program's intended actions. Operating system and application developers have responded in turn to such threats by introducing memory protection techniques. For example, Address Space Layout Randomization (ASLR) is intended to obscure the location of code in memory by randomizing the location of the stack, heap, linked libraries, and program code. ASLR may be performed once during the program lifetime, for example at program startup. Existing memory protection techniques have been successfully attacked and such attacks are widely used.

SUMMARY

It is appreciated herein that existing memory randomization techniques assume the layout of memory remains unknown to the attacker. However, as existing attacks have illustrated, memory content can leak directly or indirectly. In the direct form, memory content is sent as an output of the process because of a memory disclosure vulnerability. For example, a buffer overread vulnerability can be used to leak memory content. Moreover, the same vulnerability may be used repeatedly to leak large parts of memory, a technique that has been used to successfully bypass Address Space Layout Randomization (ASLR). Such attacks do not require a separate memory leakage vulnerability; that is, a single buffer overflow vulnerability can be used for the dual purposes of leaking the content of memory and then hijacking control. Even fine-grained variants of ASLR are shown to be ineffective against memory disclosures.

Described herein are techniques—referred to herein as "timely address space randomization"—that synchronize memory layout randomization with potential runtime disclosure. By applying re-randomization to the memory layout of a process every time it generates an output, disclosures may be rendered stale by the time they can be used by attackers to hijack control flow.

The described techniques can help protect against code reuse attacks, and thus focus on code location re-randomization. Many code reuse attacks begin with the exploitation of a memory disclosure vulnerability that reveals the location of an existing piece of executable code. The described techniques can thwart these attacks by re-randomizing the location of executable code at every opportunity an attacker has for observing the system.

According to an aspect of the disclosure, in a system executing a program within a memory address space, a method comprises: loading a code region from a program binary to a first location within the address space, detecting, during execution of the program, an output-input call pair from the program and, in response to detecting the output-input call pair from the program: selecting a second location within the address space to move the code region to, determining memory locations of one or more references to the code region, updating the values of the references in memory based on the second location and using annotation information within the program binary, and moving the code region to the second location within the address space.

In some embodiments, selecting a second location within the address space comprises selecting a random location within the address space. In certain embodiments, detecting an output-input call pair from the program is performed in kernel space and wherein updating the values of the references in memory based on the second location and using annotation information within the program binary is performed in userspace. In particular embodiments, the method further comprises, in response to detecting the output-input call pair, injecting code into the address space, the injected code operable to update the values of the references in memory based on the second location and using annotation information within the program binary.

In some embodiments, detecting an output-input call pair from the program comprises: detecting an output call from a first process within a process group, detecting an input call from a second process with the process group. In certain embodiments, moving the code region to the second location within the address space comprises updating a virtual memory page table. In one embodiment, the method further comprises, in response to detecting the output-input call pair from the program, pausing the program, making a copy of a register set associated with the program, updating one or more references to the code region within the copy of the register set, restoring the register set associated with the program using the updated copy of the register set, and resuming the program.

In certain embodiments, updating the values of the references in memory comprises updating the value of global variables, stack-based variables, and dynamically allocated variables. In some embodiments, updating the value of global variables and stack-based variables comprises using tagged unions to determine the current data type of global variables and stacked-based variables. In particular embodiments, the method further comprises tracking the location of one or more dynamically allocated references to the code region, wherein updating the values of the references in memory comprises using the tracked location of the one or more dynamically allocated references.

In some embodiments, the method further comprises, in response to detecting the output-input call pair from the program, updating one or more references to signal handlers defined within the code region.

According to another aspect of the disclosure, in a system compiling a program and executing the program within a memory address space, a method comprises analyzing source code of the program to identify code references, compiling the source code to generate an annotated binary having a code region, loading the code region into memory at a first location, detecting, during execution of the annotated binary, an output-input call pair, in response to detecting the output-input call pair, selecting a second location in memory to move the code region to, determining the location of the code references in memory, updating the value of the code references in memory based on the second location using annotation information within the annotated binary, and moving the code region from the first memory location to the second memory location.

In some embodiments, compiling the source code to generate an annotated binary having a code region comprises generating an annotated binary having information about the location of global code reference variables and stack-based code references. In certain embodiments, analyzing source code to identify code references comprises identifying global code references, stack-based code references, and dynamically allocated code references. In particular embodiments, identifying dynamically allocated code references comprises identifying dynamic allocations statements using the sizeof( ) operator on a data type associated with code references. In one embodiment, compiling the source code to generate an annotated binary comprises generating Position Independent Executable/Code (PIE/PIC).

In certain embodiments, compiling the source code to generate an annotated binary comprises treating references to objects within a program data region as externally visible global references residing in different compilation units. In particular embodiments, the annotated binary includes a Global Offset Table (GOT) through which the references to objects within a program data region are routed. In some embodiments, compiling the source code to generate an annotated binary comprises generating a tagged union wherever a union with a code reference is encountered in the source code.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which:

FIGS. 4A-4E are diagrams illustrating various types of memory references that may be updated during program address space re-randomization, in accordance with various embodiments.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. As used herein, the terms "computer memory" and "memory" refer to primary storage within a computer. In some embodiments, computer memory may be provided as random access memory (RAM) and/or disk-backed virtual memory.

The terms "computer program," "program," and "application" are used herein to refer a collection of machine code instructions and data that can be executed by a computer. A program may be stored in an executable image (e.g., a compiled binary). These terms are also used herein to refer to an executable image being executed by a computer (i.e., a process).

The terms "memory address," "address," and "memory location" refer to a location within computer memory at which a program or operating system can store and fetch data and instructions. As used herein, the term "program address space" refers to a set of memory addresses that may be accessed by a program. In some contexts, memory addresses/locations may be specified as relative values (e.g., as offsets from the base address of the program address space).

As used herein, the terms "input function call" and "input call" refer to any system call or other function call by which a user or attacker can potentially affect the internal logic of a program. Non-limiting examples of input calls include socket reads, file reads, and console reads. The terms "output function call" and "output call" refer to any system call or other function call by which a user/attacker can potentially disclose the contents of memory. Non-limiting examples of output calls include socket writes, file writes, and console writes. The term "input/output call" (or "I/O call") is used herein to refer to a call that is either an input call or an output call.

As used herein, the term "shared library" refers to a collection of computer data and/or instructions that may be shared between multiple processes/programs. In some embodiments, shared libraries may be dynamically linked into a program's address space.

Embodiments of systems, concepts, and techniques sought to be protected herein may be described as being compatible with Unix-based operating systems using an x86_64 architecture. However, it should be appreciated that they are not limited to such operating systems or instruction set architectures.

Figure 1:
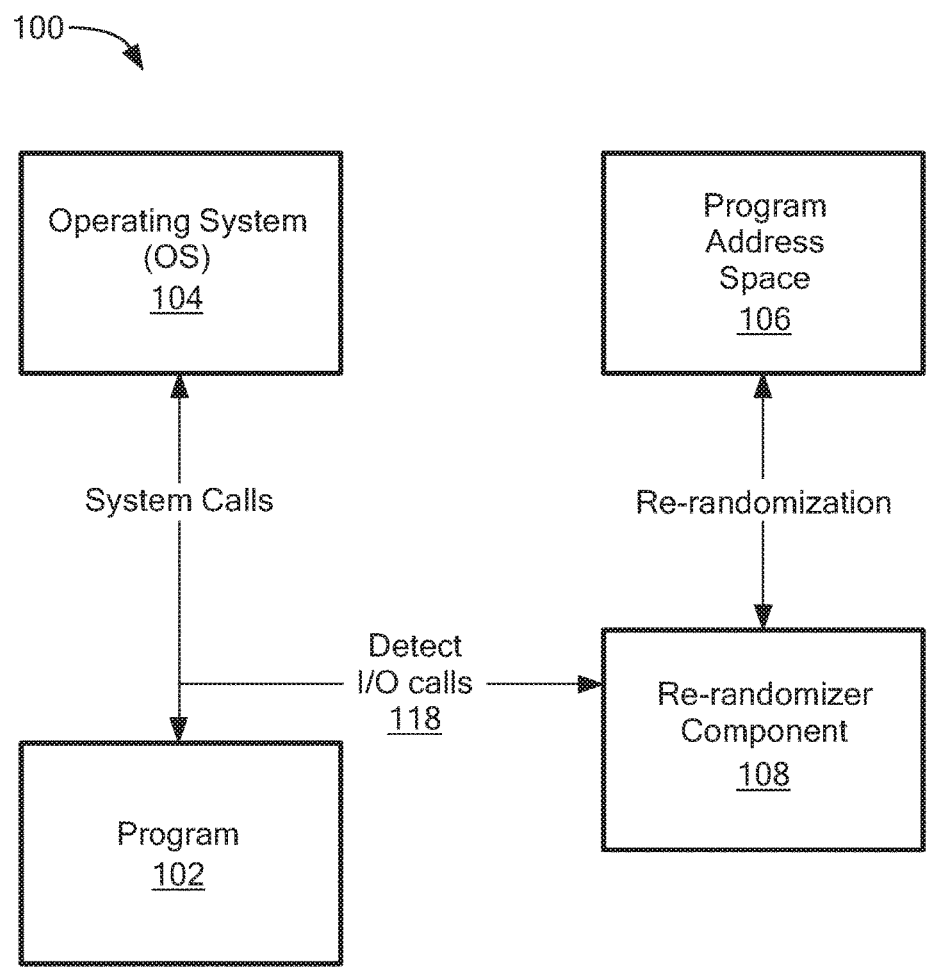
FIG. 1 is a block diagram of a computer system to provide timely address space randomization, in accordance with an embodiment.

FIG. 1 shows a computer system 100 that can provide timely address space randomization, according to an embodiment. A program 102 may utilize computer memory to store data. The memory may be provided as physical memory (e.g., dynamic random-access memory or "DRAM") and/or virtual memory.

An operating system (OS) 104 may include a memory management functionality to allocate and manage a program address space 106 for the program 102. The OS 104 may designate different regions (or "sections") of the program address space 106 for different purposes. For example, in some embodiments, the OS 104 may allocate one or more program code regions, one or more program data regions, a stack region, and one or more heap regions. In some embodiments, the OS 104 may restrict the program's memory access to the program address space 106.

In some embodiments, the program 102 may access external functions, data, and other resources provided by shared libraries. When the program 102 is loaded into memory, the external memory locations of these resources may be mapped into the program's address space 106, accessed via a data structure referred to herein as a "Global Offset Table" or "GOT." This mapping process may be part of a process sometimes referred to as "dynamic linking." At the machine code level, an external function or data object may be accessed indirectly using a relative address to an entry within the GOT.

The computer system 100 (and, in particular, the OS 104) may implement various memory protection techniques to prevent an attacker from corrupting the address space 106 used by program 102. In some embodiments, the OS 104 may include guard-based memory defenses such as stack cookies (sometimes referred to as "stack canaries") and heap integrity checks. In certain embodiments, the OS 104 may include diversity-based memory protection techniques such as Address Space Layout Randomization (ASLR). In particular embodiments, ASLR provided by the OS 104 may randomize the location (e.g., the base address) of program memory regions during program startup.

In general, it may be impractical (or even impossible) to prevent memory disclosures in arbitrary programs provided as commodity binary executables. As a result, it can be assumed that an attacker is able to determine the location and contents of program memory regions, even if the region locations are randomized using ASLR.

In the embodiment of FIG. 1, the computer system 100 includes a re-randomizer component 108 to mitigate the impact of memory disclosures and help protect against code reuse attacks. As will be described in more detail below, the re-randomizer component 108 may be configured to re-randomize the location of code regions within the program address space 106 at certain points throughout the program's execution. In some embodiments, the re-randomizer component 108 may include a kernel portion and a userspace portion. In certain embodiments, the re-randomizer component 108 may be implemented, at least in part, as a kernel module (e.g., a Linux kernel module).

In other embodiments, the re-randomizer component 108 may be included directly in the kernel code (e.g., as a modification to the Linux kernel). In other embodiments, the re-randomizer component 108 may be provided as a userspace library.

In some embodiments, the re-randomizer component 108 may detect and/or intercept I/O calls made by the program 102 and perform re-randomization in response thereto. It is appreciated herein that output calls are a means by which an attacker can disclose vital memory, and that input calls are a means by which an attacker can influence the internal logical of the program. Accordingly, in some embodiments, the re-randomizer component 108 keys re-randomization off one or more output calls followed by an input call. This sequence of I/O calls is referred to herein as an "output-input call pair."

In certain embodiments, the OS 104 may be provided as a Unix-type operating system and the re-randomizer component 108 may detect/intercept one or more of the following input system calls from the program 102: read( ), pread64( ), readv( ), recvfrom( ), recvfrom( ), mq_timedreceive( ), preadv( ), and recvmmsg( ). The re-randomizer component 108 may also detect/intercept the fork( ) and/or vfork( ) system calls and treat these calls as "input" calls. Although not technically "input" calls, treating fork( ) and vfork( ) as such can ensure that two correlated processes have different memory layouts at the time of their split. The re-randomizer component 108 may further detect/intercept one or more of the following output system calls from the program 102: write( ), pwrite64, writev( ), sendto( ), sendmsg( ), mq_timedsend( ), pwritev( ), and/or sendmmsg( ).

Figure 2:
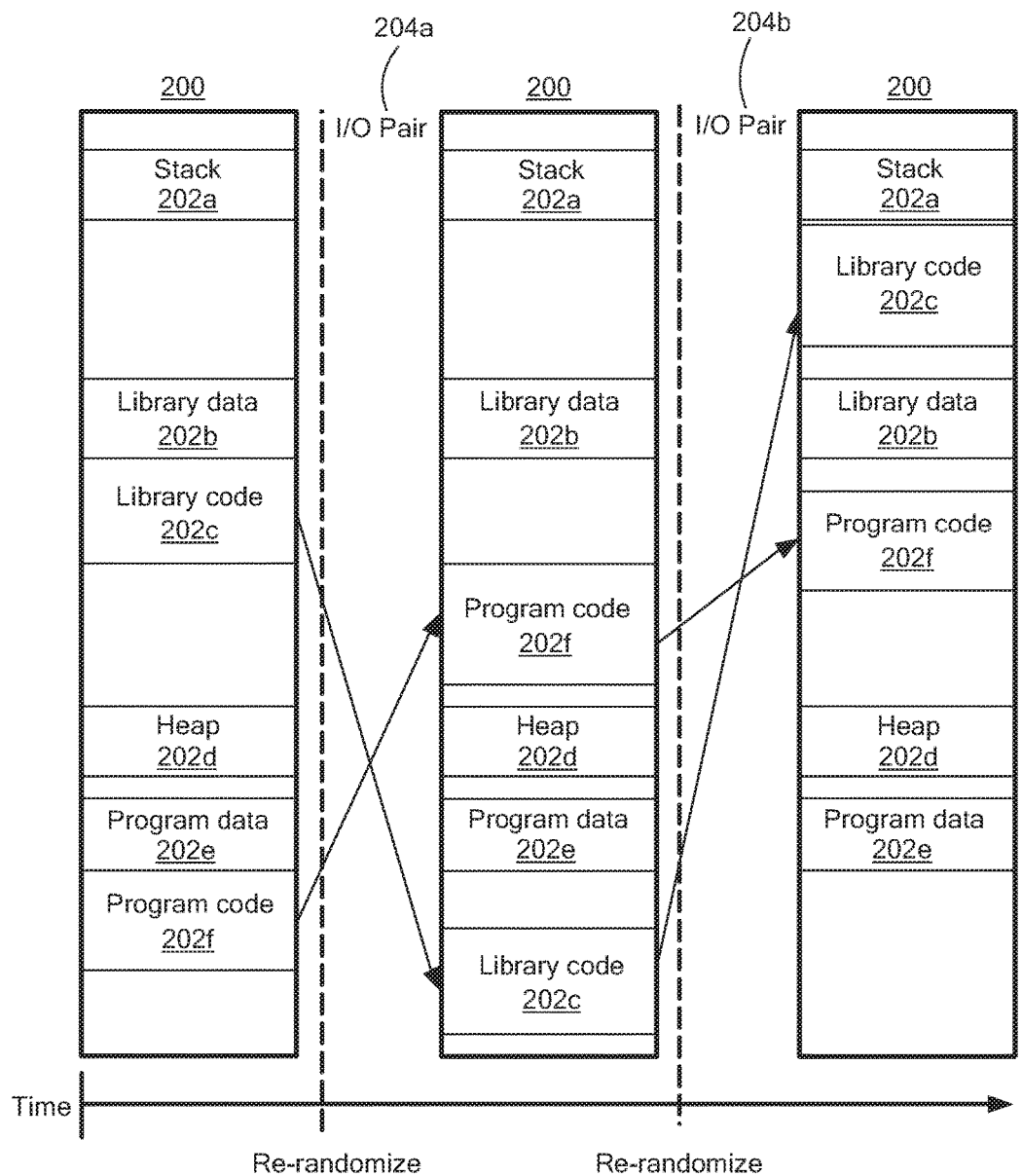
FIG. 2 is a sequence diagram illustrating timely randomization of a program address space, in accordance with an embodiment.

FIG. 2 illustrates timely randomization of a program address space 200, according to some embodiments. The address space 200 may be the same as or similar to program address space 106 shown in FIG. 1. The address space 200 may include one or more regions, generally denoted 202. In the embodiment shown, the address space 200 includes a stack region 202a, a library data region 202b, a library code region 202c, a heap region 202d, a program data region 202e, and a program code (or "text") region 202f. In other embodiments, a program address space 200 may include multiple instances of a given type of memory region, for example multiple program data regions 202e.

It will be appreciated that the various regions 202 are exaggerated in size and relative positioning for illustrative reasons. In practice, a given memory region 202 may be much smaller inside a vastly larger address space 200. For example, the size of a program code region 202f may be on the order of $10^{\wedge}7$ to $10^{\wedge}8$ bytes, whereas the size of the address space 200 could be on the order of $10^{\wedge}19$ bytes.

Each of the memory regions 202a-202f has a base address that can be expressed as a value relative to the program address space 200. In some embodiments, Address Space Layout Randomization (ASLR) may be used to determine an initial random location of one or more of the memory regions 202 (e.g., during startup time).

In various embodiments, the location of one or more code regions may be randomly relocated at every output-input call pair. For example, as shown in FIG. 2, the library code region 202c and the program code region 202f are randomly relocated in response to a first output-input call pair 204a, and again in response to a second output-input call pair 204b. By re-randomizing the program memory layout after one or more output system calls and before processing an input system call, the impact of memory disclosures may be mitigated because any information about the layout of memory that an attacker obtains at output time is stale by the time there is an opportunity to use that information (e.g., to complete a code reuse attack).

Figure 3:
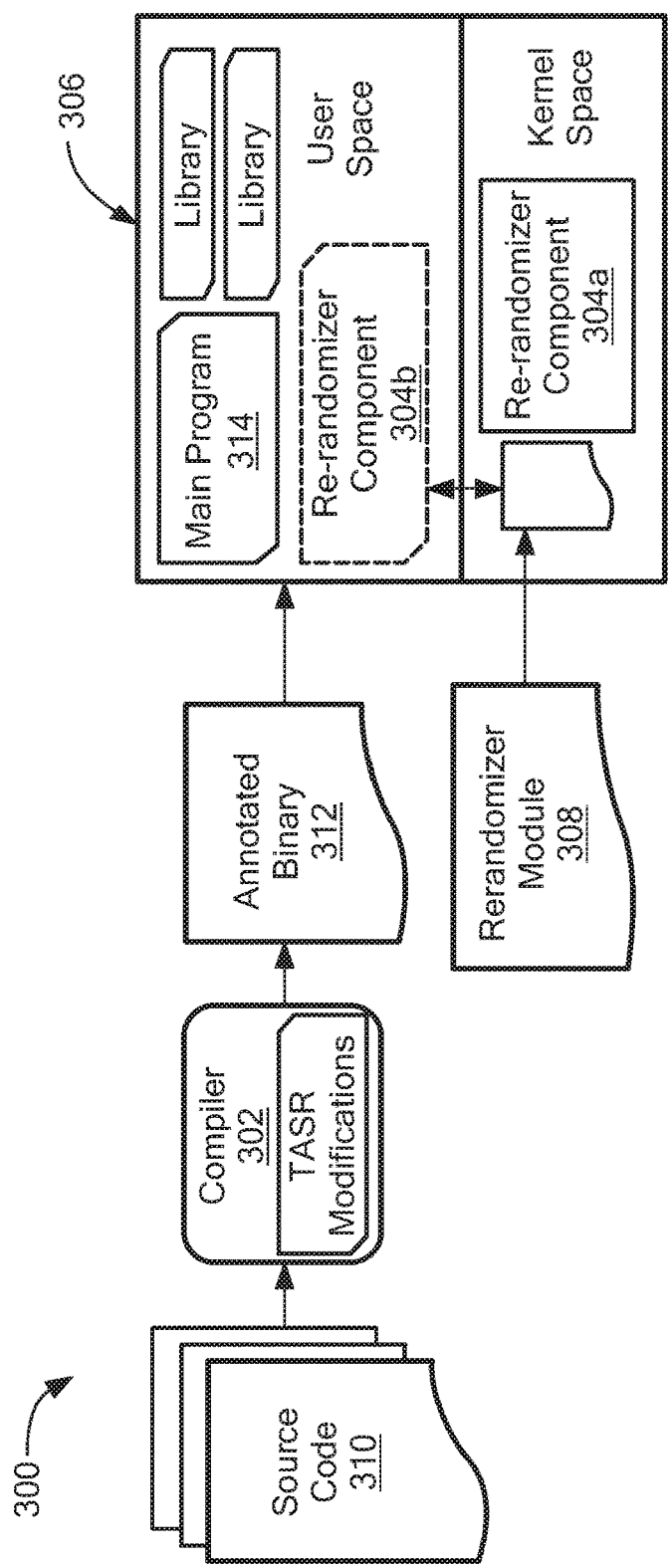
FIG. 3 is a block diagram of a computer system to provide timely address space randomization, in accordance with another embodiment.

FIG. 3 shows one implementation of a computer system 300 that can perform timely randomization of a program address space. The computer system 300 includes a compiler component 302 and a memory space 306 divided into kernel space and userspace regions.

The compiler component 302 is configured to compile a program source code 308 into a so-called "annotated binary" 312. The annotated binary 312 includes computer instructions (and associated data) that can be executed by an OS instance of the program (i.e., a "process"). The memory space 306 corresponds to the full memory space used by the process, and may include a program code region 314 in userspace and a re-randomizer component 304a, 304b (generally denoted 304) split between user and kernel space, as shown.

In addition, the compiler component 302 may be configured to analyze the source code 310 and generate information that can be used by the re-randomizer component 304 to re-randomize the program's address space at arbitrary points throughout the program's runtime. Such information, referred to herein as "annotation information," may be stored within the annotated binary 312 such that it is accessible by the re-randomizer component 304 during runtime. In some embodiments, the annotation information may be stored within a new section (e.g., a debugging section) of the annotated binary 312. The additional section within the binary 312 can be used by computer systems enabled with a re-randomizer component 304 and ignored by other systems.

In certain embodiments, the annotation information is sufficient to enable the re-randomizer component 304 to randomly relocate one or more regions of program code 314, without affecting the program's correctness or causing it to crash. In various embodiments, the compiler component 302 uses techniques described below in conjunction with FIGS. 4A-4E to generate the annotated binary 312.

In various embodiments, the compiler component 302 generates Position Independent Executable/Code (PIE/PIC). For example, the compiler component 302 may use PIE/PIC compiler options for UNIX-like systems, and equivalent compiler options available within other major operating system environments.

In some embodiments, the source code 310 may be provided as one or more files comprising program source code, and the annotated binary 312 may be generated in the form of an executable file. In particular embodiments, the source code 308 includes may include ISO C source code.

In certain embodiments, the annotated binary 312 may be generated in ELF (Executable and Linkable Format) file format. In one embodiment, the generated ELF file 312 may include a debugging section in DWARF format to store annotation information used by the re-randomizer component 304.

In some embodiments, the compiler component 302 may be provided as commercial or open source compiler that is modified or extended to generate annotation information.

In one embodiment, the compiler component 302 may be provided as a modified version of GCC (the GNU C Compiler).

The re-randomizer component 304, which may be the same as or similar to the re-randomizer component 108 shown in FIG. 1 and described above in conjunction therewith, is configured to determine when the program's address space should be re-randomized and to use annotation information within the annotated binary 312 to carry out re-randomization without disrupting the program.

In the embodiment of FIG. 3, the re-randomization component 304 includes a kernel component 304a configured to run within the kernel space, and a userspace component 304b configured to run within a userspace. In various embodiments, the re-randomizer component 304 may be provided as a kernel module 308 that can be statically and/or dynamically loaded into the OS. In one embodiment, the kernel module 308 may be provided as a Linux kernel module. In other embodiments, the re-randomizer component 304 may be included directly in the kernel code (e.g., as a modification to the Linux kernel). In other embodiments, the re-randomizer component 304 may be provided as a userspace library.

The kernel component 304a may be configured to control the timing of re-randomization and handles certain other bookkeeping tasks, whereas the userspace component 304b may be configured to update the program state in response to a re-randomization.

In various embodiments, the kernel component 304a triggers re-randomization of the program's address space when an output-input call pair is detected. In various embodiments, the kernel handles all external I/O calls and, thus, may be configured to track and correlate I/O calls across the entire process. In certain embodiments, the kernel component 304a may be configured to track I/O call groups across multiple threads and/or multiple processes within the same process group.

When a re-randomization is triggered, the kernel component 304a may determine which regions of program memory should be relocated, In certain embodiments, the kernel component 304a checks each region within the program's address space in order to determine if it should be re-randomized. In some embodiments, only code regions are relocated (e.g., program code regions 202f and library code regions 202c as shown in FIG. 2). In particular embodiments, the kernel component 304a may perform this check once (i.e., the first time re-randomization is triggered) and stores the list of memory regions to re-randomized for subsequent use.

Once the list of memory regions to be relocated is determined, the kernel component 304a may select a new random memory address for each region. The kernel component 304a may then make this addressing information available to the userspace component 304b, along with a copy of the current register set and other information that required by the userspace component 304b to update the program's state. In certain embodiments, the kernel component 304a injects such information into the program's address space (e.g., as a new program data region).

The kernel component 304a may then inject and transfer control to the userspace component 304b, which may perform various processing described below. After the userspace component 304b has completed its processing, control may return to the kernel component 304a. The kernel component 304a may update the register set of the original process if required and perform the actual move of the memory regions in question. In certain embodiments, the program memory regions are moved by updating virtual memory page tables rather than by copying the contents of memory from one location to another. In various embodiments, when the kernel component 304b moves a code region, it may also move a corresponding GOT such that relative references from the code region to the GOT remain valid.

In certain embodiments, the kernel component 304a may update any kernel-stored references to the program's memory that may be affected by re-randomization. For example, the kernel component 304a may update the location of any signal handling functions set by the program if program code regions 314 are relocated so that the kernel-stored code references remain valid.

In various embodiments, kernel component 304a may perform various initialization and cleanup tasks as part of re-randomization. Non-limiting examples of initialization and cleanup tasks that may be performed by the kernel component 304a include: maintaining the location of any signal handling functions set by the program that may need to be updated if corresponding code regions are relocated; handling bookkeeping for various kernel data structures; removing artifacts in memory that may be left over; and setting I/O counters and markers. To perform such tasks, the kernel component 304a may allocate and initialize data structures at program startup and destroyed them at shutdown.

In some embodiments, the kernel component 304a determines whether re-randomization should be performed for a given program based on the presence of a special section within the binary 312. For example, as discussed further below in conjunction with FIG. 4D, a special GOT data section may be added to the program binary 212 by the compiler component 302 to provide a level of indirection to data objects in other compilation units. The kernel component 304a may attempt to detect the presence of this special data section to determine if re-randomization should be performed. Advantageously, the annotated binary 312 can be executed by a computer system that does not include the re-randomizer component 304. Here, the annotation information and/or special GOT data section may simply be ignored.

The userspace component 304b is configured to update the program's state in response to a re-randomization event. In some embodiments, the userspace component 304b updates code reference (e.g., "code pointer") values that would be invalidated when the kernel component 304a relocates one or more code regions. In various embodiments, the userspace component 304b uses techniques described below in conjunction with FIGS. 4A-4C to code reference values.

In some embodiments, the userspace component 304b may be temporarily "injected" into the target program's code region 314 space by the kernel component 304a when an output-input call pair is detected. After the userspace component 304b has completed its work (e.g., updating code reference values) and control is returned to the userspace component 304a, the userspace component 304b may be removed from the program's code region 314. Thus, the userspace component 304b may be logically separate from the target program, but treated as part of the process for the duration of its existence and given full access to the program's memory. In other embodiments, re-randomization may be invoked via code injected during the compilation process; this approach would require logic to handle the tracking of I/O ordering.

In particular embodiments, the kernel component 304a may inject a code region and a data region into the program's address space when re-randomization is triggered. The code region may be populated with code corresponding to the userspace component 304b, and the data region may be populated with information required by the userspace component 304b to update code references (e.g., address information and a copy of the register set at the time re-randomization was triggered). Any memory regions injected into the program's address space may be removed after code references are updated. In one embodiment, no state (other than that used by the program itself) is maintained within userspace between re-randomizations.

In some embodiments, the re-randomizer component 304 takes control over the program's execution when a re-randomization is triggered and does not return to the control to normal program flow until re-randomization is complete and the program's state is updated accordingly.

FIGS. 4A-4E illustrate different types of memory references that may need to be updated when one or more code regions are randomly relocated during program execution. Each of the figures shows a program address space (e.g., address space 400 in FIG. 4A) that may be the same as or similar to program address space 200 shown in FIG. 2. For clarity in the drawings, not all program memory regions are shown in the FIGS. 4A-4E.

Code references can be divided into three major categories: (1) references to code residing within the same compilation unit; (2) references to code residing in other compilation units; and (3) references to code that are assigned at runtime. References to code residing within the same compilation unit require no special action beyond PIE/PIC compilation, using standard compiler and linker flags. Position-independent code uses relative offsets to access code within the same unit, rather than absolute references. Because each code region moves as a block, relative offsets do not change and there are no references that require updating.

Similarly, references to code residing in other compilation units may require no special action beyond standard compilation and linking options. References to code in other compilation units are generally not resolvable at the time of compilation, and thus are not assigned absolute addresses using standard compilation. Instead, references are made by relative offset into a GOT. In various embodiments, each code region includes (or is associated with) a corresponding GOT. When a code region is randomly relocated, the re-randomizer component 304 (FIG. 3) may be configured to move both the code region and its corresponding GOT (if any) such that references thereto remain valid. In certain embodiments, code references residing within the GOT itself may be updated, as subsequently described.

Unlike the first two categories of code references, it may be necessary to update runtime-assignable code references when program memory is re-randomized. To achieve this, the compiler component 302 (FIG. 3) may be configured to detect such references and augment the program with annotation information that can be used at runtime to update such code references.

In ISO C, assignable code references are declared as function pointers, for example:

int (*fptr) (int, char*);

Function pointers can be manipulated, set, and explicitly invoked at will within program source code 310. The compiler component 302 may generate sufficient annotation information within the program binary 312 to enable the re-randomization component 304 to identify and update such references at arbitrary points during the program's execution.

Runtime-assignable code references can be divided into three sub-categories: (a) global variables, (b) local variables and return addresses residing on the stack, and (c) dynamic allocations. Techniques for handling sub-categories (a), (b), and (c) are described below in conjunction with FIGS. 4A, 4B, and 4C, respectively.

Referring to FIG. 4A, a program's address space 400 includes a code region 402 and a data region 404. The program has a global variable code reference 406 (e.g., global variable having a function pointer type) that may reference code within the code region 402, as shown. Global variables reside at fixed locations within the program data region 404, selected during compilation. Thus, in some embodiments, the compiler component 302 (FIG. 3) can carry this information through the compilation process and emit it as part of the annotated binary 312 (e.g., within a debugging section of the binary 312). The userspace component 304b (FIG. 3) can access this annotation information to update the value of the global code reference 406 whenever the code region 402 is relocated.

Referring to FIG. 4B, a program's address space 410 includes a code region 412 and a stack region 414 in which code references may be stored (e.g., function pointers declared as local variables or function return values). In the example shown, the program includes a stack-based code reference 416 that may be assigned a value within the code region 412, as shown. Stack-based code references 416 can be identified at compilation time and exist in calculable locations. The compiler component 302 (FIG. 3) can determine location information for stack-based code references 416 at every single program instruction, including the exact memory addresses (calculable through an offset) and hardware registers in which the references 416 resides. In certain embodiments, the compiler component 302 uses existing compiler options that compute the locations at which variables are stored for each instruction, and that information is carried through the compilation process and emitted within the annotated binary 312 (e.g., within a debugging section of the binary 312).

The userspace component 304b (FIG. 3) can access this stack variable annotation information to update the value of the stack-based code reference 414 whenever the code region 412 is relocated. In some embodiments, userspace component 304b may also update stack-based code references that happen to be stored within a register at the time re-randomization is triggered. To allow for this, the kernel component 304a may make a copy of the register set when re-randomization commences, pass this copy to the userspace component 304b for updating, and then restore the register set from the updated copy when re-randomization completes and control is returned to the program.

In one embodiment, the compiler component 302 may be provided as GCC (or a modified version thereof) and the -fvar-tracking and -fvar-tracking-assignments may be used to generate stack-based code reference tracking/annotation information.

Referring to FIGS. 4A and 4B, one complication with updating global variable code references 406 and stack-based code references 416 arises with the use of unions, whereby a single data location may indeterminately store either a code reference or some other data type. To address this issue, in certain embodiments, the compiler component 302 (FIG. 3) may generate a so-called "tagged union" wherever a union with a code reference is encountered. A tagged union incorporates an extra data field to label the present data type stored in the union, and at each union assignment, the label is updated to mark it as storing a code reference or some other data type. In one embodiment, the compiler component 302 implements tagged unions based on the teaches of Rafkind, J., Wick, A., Regehr, J., and Flatt, M. in "Precise garbage collection for c." (In Proc. of ISMM (2009)), which is herein by incorporated by reference in its entirety.

In some embodiments, information about the location of global code references 404 and/or stack-based code references 414 may be added to a debugging section of the annotated binary 312 (FIG. 3) in DWARF format. The DWARF debugging information may include a complete reference to all global and stack-based code references. The data may be assembled into a data structure known as an "interval tree" which allows fast variable lookup based on the program instruction pointer. At runtime, this data structure can be used in conjunction with stack unwinding to step back through each stack frame of the process and determine what variables were in use during each frame. For each stack frame, the instruction pointer is used to query the interval tree and return a complete list of code references in use, and the memory addresses (or registers) in which they are located at that time. Each pointer is updated in turn. Global variables and other global references, which reside at static locations, may also be queried via the DWARF interval tree but do not depend on the current instruction pointer.

Referring to FIG. 4C, a program address space 420 includes a code region 422 and a heap region 424 in which dynamically allocated variables may be stored. In the example shown, the program includes a dynamically allocated code reference 426 (e.g., a dynamically allocated variable having a function pointer type) that references the code region 422. Unlike global and stack-based code references, the location of dynamically allocated code references cannot be determined at compilation time. Thus, in various embodiments, the compiler component 304 (FIG. 3) may insert runtime tracking code into the annotated binary 312 to track dynamic code reference allocations. In some embodiments, the compiler component 304 generates instructions to record the memory locations of dynamically allocated code references within a table or other suitable data structure. During runtime, as code references are dynamically allocated and deallocated, entries may be added and removed from the table. The userspace component 304b can iterate through this table to update the value of dynamically allocated code references 426 whenever the code region 412 is relocated.

In certain embodiments, the compiler component 304 (FIG. 3) may insert runtime-tracking code into the annotated binary 312 as a custom memory allocator component by incorporating the equivalent of a small library through which all dynamic allocations are routed. It some embodiments, the function signature of the custom allocator may be added to various stages of the compilation process to properly convey necessary information between compilation stages.

In certain embodiments, the compiler component 302 (FIG. 3) relies on the sizeof( ) operator being used within dynamic allocation to identify whether the dynamically allocated memory will be used to store code references or some other type of data. For example, the statement:

void*mem=malloc(10*sizeof(struct some_structure))

may be interpreted as an allocation of a block of memory including ten (10) elements each having the type "some_structure." The compiler component 302 can use information about the "some_structure" data type to determine if the dynamic allocation will be used to store code references or not. In one embodiment, the compiler component 302 generates a warning if a dynamic memory allocation does not use the sizeof( ) operator.

Referring to FIG. 4D, in standard compilation, objects within a program data region 434 may be referenced by relative addressing from a corresponding program code region 432. For example, as shown, code region 432 may include a relative reference 436 to data region 434. Such references are referred to herein as "data region object references." Using standard compilation techniques, when the code region 432 is moved, it would be necessary to update the value of the data reference 436 to prevent it from being invalidated.

Referring to FIG. 4E, to address the problem described above in conjunction with FIG. 4D, in some embodiments the compiler component 302 (FIG. 3) treats all objects within the program data region 434 as if they were externally visible global references residing in different compilation units. As discussed above, according to existing compiler techniques, external data references are automatically routed through a GOT 438. Thus, by treating all objects within the program data region 434 as external objects, all relative references 436 to the data region 434 are automatically converted into relative references 436' to the GOT 438. As also discussed above, the re-randomization component 304 may be configured to relocate the GOT 438 relative to the code region 432, so all data region object references 436' remain valid after each runtime re-randomization. Thus, at runtime, the re-randomization component 304 does not need update the value of data region object references 436'.

In addition to data reference, the GOT 438 may also store code references. In some embodiments, the re-randomization component 304 may update code references stored within the GOT 438 when the corresponding code regions are relocated.

Figure 5:
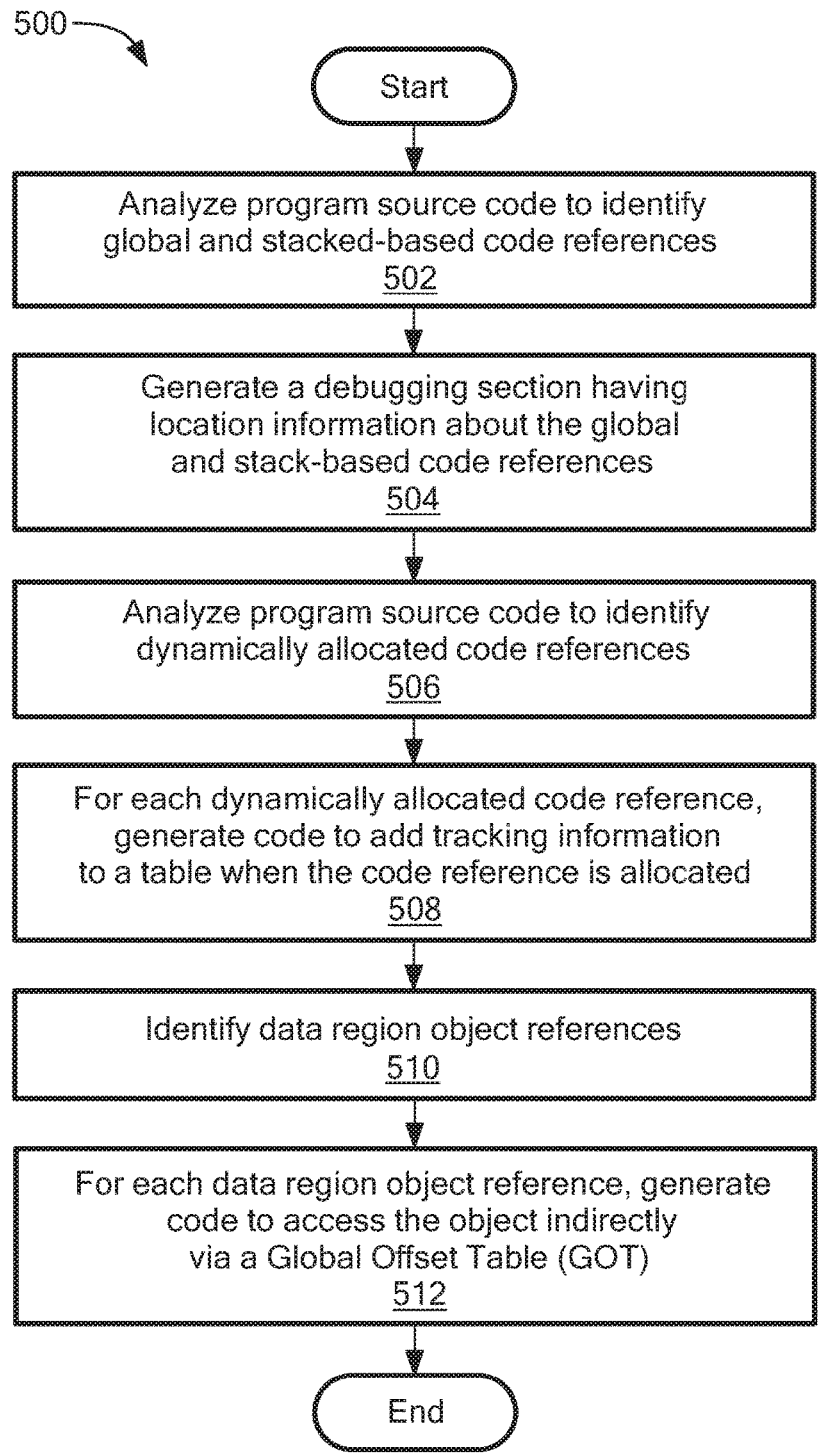
FIGS. 5 and 6 are flow diagrams of processing that may be performed in some embodiments.
Figure 6:
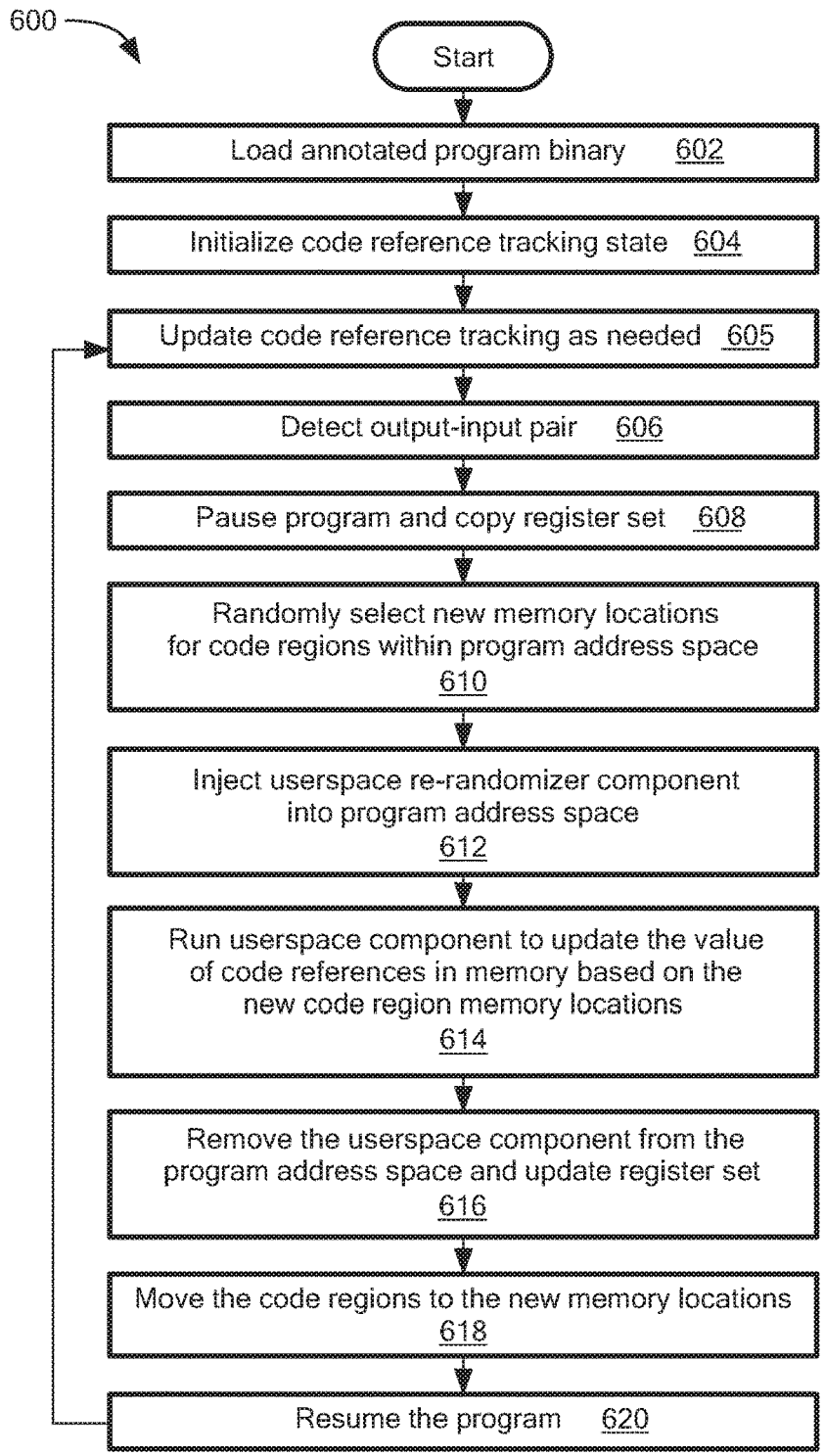

FIGS. 5 and 6 are flow diagrams showing illustrative processing that can be implemented within a computer system, such as the computer system 100 of FIG. 1 and/or the computer system 300 of FIG. 3. Within the flow diagrams, rectangular elements (typified by element 502 in FIG. 5), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to FIG. 5, an illustrative process 500 may be used to generate an annotated program binary, meaning a program binary that includes sufficient information and/or code to enable the program's memory layout to be re-randomized at runtime. In some embodiments, the process 500 may be implemented within a compiler component, such as compiler component 302 of FIG. 3.

At block 502, program source code may be analyzed to identify global and stack-based code references. At block 504, information about global and stack-based code references may be added to a debugging section. In some embodiments, the debugging section includes information in DWARF format.

At block 506, program source code may be analyzed to identify dynamically allocated code references. In some embodiments, this includes identifying dynamic allocations that will be used to store code references based on the size-of( ) operator. At block 508, for each dynamically allocated code reference, instructions may be generated to record the location of the dynamically allocated code reference within a table or other data structure at runtime.

At block 510, program source code may be analyzed to identify data region object references (i.e., references to objects within the program's data region). At block 512, for each data region object reference, instructions may be generated to access the object indirectly via a GOT. In some embodiments, this includes treating objects within the program's data region as externally visible global references residing in different compilation units.

The generated debugging section (blocks 502-504), the generated instructions (blocks 506-508), and a program section for the GOT (blocks 510-512) may added to the program binary.

Referring to FIG. 6, an illustrative process 600 may be used to re-randomize one or more areas of program memory. In some embodiments, the process 600 may be implemented within a re-randomizer component, such as re-randomizer component 304 of FIG. 3.

At block 602, an annotated program binary may be loaded by an operating system (OS) having a virtual memory space divided into kernel and user regions. At block 604, data structures and state information used to track the location of code references may be initialized. In some embodiments, this includes initializing a data structure (e.g., a table or a list) used to track the location of dynamically allocated code references. In certain embodiments, this includes initializing a data structure used to track the location of signal handling functions set by the program. In some embodiments, block 604 includes initializing I/O counters and markers and/or other data structures used for bookkeeping.

At block 605, the data structures and state information used to track the location of code references is updated, as needed. In some embodiments, a dynamically maintained list of code references is updated.

At block 606, an output-input call pair may be detected from the program. In response, at block 608, control may be transferred from the program to the re-randomization component (i.e., the program may be "paused"). In some embodiments, a copy of the current register set is made.

At block 610, new memory locations may be randomly chosen for one or more code regions within the program's address space. At block 612, a userspace re-randomization component may be injected into the program's address space. The userspace component may include a code region to update code references based on the new memory locations, and a data region populated with data required to perform the updating (e.g., the new code region memory locations). In certain embodiments, a copy of the register set (e.g., the copy made when the program was paused at block 608) is also injected into the program's address space.

At block 614, control may be transferred to the userspace component, which may update the value of code references using techniques described above in conjunction with FIGS. 4A-4C. In some embodiments, the userspace component updates code references within the register set copy. In certain embodiments, a kernel component of the re-randomization maintains the location of any set signal handling function; these references may be updated as needed.

At block 616, when the userspace component completes its task and exits, the kernel component may remove it from userspace. This may include removing any memory regions that were injected into the program's address space. In some embodiments, the program's register set may be updated based on the modified copy.

At block 618, the actual move of the memory regions in question may be performed. In some embodiments, this is done by updating virtual memory page tables rather than copying the contents of memory from one location to another.

At block 620, control may be returned to the program (i.e., the program may "resume") and the process 600 may repeat from block 605.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. In a system executing a program within a memory address space, a method comprising:

loading a code region from a program binary to a first location within the address space;

detecting, during execution of the program, one or more output calls immediately followed by an input call (an "output-input call pair") from the program; and in response to detecting the output-input call pair from the program and before processing the input call on behalf of the program:
  selecting a second location within the address space to move the code region to;
  determining memory locations of one or more references to the code region;
  updating the values of the references in memory based on the second location and using annotation information within the program binary; and
  moving the code region to the second location within the address space;
wherein an output call comprises a function call, made by the program, that discloses contents of memory of the program to a user of the program, and wherein an input call comprises a function call, made by the program, that enables a user of the program to affect internal logic of the program.

2. The method of claim 1 wherein selecting a second location within the address space comprises selecting a random location within the address space.

3. The method of claim 1 wherein detecting an output-input call pair from the program is performed in kernel space and wherein updating the values of the references in memory based on the second location and using annotation information within the program binary is performed in userspace.

4. The method of claim 3 further comprising, in response to detecting the output-input call pair:
  injecting code into the address space, the injected code operable to update the values of the references in memory based on the second location and using annotation information within the program binary.

5. The method of claim 1 wherein detecting an output-input call pair from the program comprises:
  detecting an output call from a first process within a process group; and
  detecting an input call from a second process with the process group.

6. The method of claim 1 wherein moving the code region to the second location within the address space comprises updating a virtual memory page table.

7. The method of claim 1 further comprising, in response to detecting the output-input call pair from the program:
  pausing the program;
  making a copy of a register set associated with the program;
  updating one or more references to the code region within the copy of the register set;
  restoring the register set associated with the program using the updated copy of the register set; and
  resuming the program.

8. The method of claim 1 wherein updating the values of the references in memory comprises updating the value of global variables, stack-based variables, and dynamically allocated variables.

9. The method of claim 8 wherein updating the value of global variables and stack-based variables comprises using tagged unions to determine the current data type of global variables and stacked-based variables.

10. The method of claim 8 further comprising:
  tracking the location of one or more dynamically allocated references to the code region, wherein updating the values of the references in memory comprises using the tracked location of the one or more dynamically allocated references.

11. The method of claim 1 further comprising, in response to detecting the output-input call pair from the program:
  updating one or more references to signal handlers defined within the code region.

12. In a system compiling a program and executing the program within a memory address space, a method comprising:
  analyzing source code of the program to identify code references;
  compiling the source code to generate an annotated binary having a code region;
  loading the code region into memory at a first location;
  detecting, during execution of the annotated binary, one or more output calls immediately followed by an input call (an "output-input call pair");
  in response to detecting the output-input call pair and before processing the input call on behalf of the program:
    selecting a second location in memory to move the code region to;
    determining the location of the code references in memory;
    updating the value of the code references in memory based on the second location using annotation information within the annotated binary; and
    moving the code region from the first memory location to the second memory location;
wherein an output call comprises a function call, made by the program, that discloses contents of memory of the program to a user of the program, and wherein an input call comprises a function call, made by the program, that enables a user of the program to affect internal logic of the program.

13. The method of claim 12 wherein compiling the source code to generate an annotated binary having a code region comprises generating an annotated binary having information about the location of global code reference variables and stack-based code references.

14. The method of claim 12 wherein analyzing source code to identify code references comprises identifying global code references, stack-based code references, and dynamically allocated code references.

15. The method of claim 14 wherein identifying dynamically allocated code references comprises identifying dynamic allocations statements using the sizeof( ) operator on a data type associated with code references.

16. The method of claim 12 wherein compiling the source code to generate an annotated binary comprises generating Position Independent Executable/Code (PIE/PIC).

17. The method of claim 12 wherein compiling the source code to generate an annotated binary comprises treating references to objects within a program data region as externally visible global references residing in different compilation units.

18. The method of claim 17 wherein the annotated binary includes a Global Offset Table (GOT) through which the references to objects within a program data region are routed.

19. The method of claim 12 wherein compiling the source code to generate an annotated binary comprises generating a tagged union wherever a union with a code reference is encountered in the source code.

20. A system comprising:
  one or more processors;
  a volatile memory; and
  a non-volatile memory storing computer program code that when executed on the processor causes execution across the one or more processors of a process operable to perform the operations of:

load a code region from a program binary to a first location within the address space;

detect, during execution of the program, one or more output calls immediately followed by an input call (an "output-input call pair") from the program;

in response to detecting the output-input call pair from the program and before processing the input call on behalf of the program:

select a second location within the address space to move the code region to;

determine memory locations of one or more references to the code region;

update the values of the references in memory based on the second location and using annotation information within the program binary; and move the code region to the second location within the address space;

wherein an output call comprises a function call, made by the program, that could disclose contents of memory of the program to a user of the program, and wherein an input call comprises a function call, made by the program, that enables a user of the program to affect internal logic of the program.

* * * * *